(12) United States Patent
Mauritz et al.

(10) Patent No.: US 6,853,620 B2
(45) Date of Patent: Feb. 8, 2005

(54) BUS PROTOCOL

(75) Inventors: Karl Mauritz, Chandler, AZ (US);
Chris Banvai, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 09/908,259

(22) Filed: Jul. 17, 2001

(65) Prior Publication Data

US 2003/0016663 A1 Jan. 23, 2003

(51) Int. Cl.⁷ .......................... H04L 12/26; H04L 12/56
(52) U.S. Cl. ..................... 370/237; 370/238; 370/401
(58) Field of Search ................................ 370/217, 216, 370/218, 221, 227, 242, 244, 250, 235, 237, 238, 389, 401, 326, 328, 408, 410, 392, 402, 465, 475

(56) References Cited

U.S. PATENT DOCUMENTS

| | | | | |
|---|---|---|---|---|
| 4,875,208 A | * | 10/1989 | Furuhashi et al. | 370/400 |
| 5,537,394 A | * | 7/1996 | Abe et al. | 370/252 |
| 5,838,663 A | * | 11/1998 | Elwalid et al. | 370/233 |
| 6,011,804 A | * | 1/2000 | Bertin et al. | 370/468 |
| 6,049,524 A | * | 4/2000 | Fukushima et al. | 370/220 |
| 6,147,971 A | * | 11/2000 | Rochberger et al. | 370/238 |
| 6,246,669 B1 | * | 6/2001 | Chevalier et al. | 370/238 |
| 6,269,076 B1 | * | 7/2001 | Shamir et al. | 370/217 |
| 6,496,510 B1 | * | 12/2002 | Tsukakoshi et al. | 370/401 |
| 6,577,653 B1 | * | 6/2003 | Rochberger et al. | 370/536 |
| 6,614,757 B1 | * | 9/2003 | Rochberger et al. | 370/231 |
| 6,697,325 B1 | * | 2/2004 | Cain | 370/217 |

* cited by examiner

Primary Examiner—Chau Nguyen
Assistant Examiner—Soon D. Hyun
(74) Attorney, Agent, or Firm—Robert A. Greenberg (57) ABSTRACT

Disclosed are a system and method of transmitting data among communication nodes. A first communication node is coupled to a plurality of adjacent communication nodes. The first communication node may receive a data transmission comprising a destination associated with a second communication node. The first communication node may receive status data from one or more adjacent communication nodes through a control channel coupled between the first communication node and the adjacent communication node where the status data comprises status information for at least the adjacent node. A communication node adjacent to the first communication node may be selected to forward the received data to a destination based upon the status data received from the adjacent communication nodes.

20 Claims, 5 Drawing Sheets

BUS PROTOCOL

This application relates to U.S. application Ser. No. 09/908,273, filed on Jul. 17, 2001.

BACKGROUND

1. Field

The subject matter disclosed herein relates to communication systems. In particular, the subject matter disclosed herein relates to communication systems for transmitting data among nodes.

2. Information

Communication infrastructures are typically deployed to meet requirements for providing communication services to one or more subscribers or users. Such communication infrastructures are typically designed to meet one or more level of service to subscribers within cost constraints. Such constraints are typically determined by the availability of affordable components and subsystems to build the communication infrastructure.

An existing communication infrastructure may be modified to meet additional requirements. For example, communication infrastructures may be expanded to serve additional subscribers or users. Also, communication infrastructures may be upgraded to meet more demanding service requirements to subscribers or users by incorporating newly available components or subsystems. In modifying an existing communication infrastructure to meet such additional requirements, there is a desire to upgrade or exapand existing communication infrastructures cost effectively while building on legacy systems.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise processing circuitry in combination with machine-executable instructions stored in a memory. However, these are merely examples of structures which may provide logic and embodiments of the present invention are not limited in these respects.

A "data bus" as referred to herein relates to circuitry for transmitting data between devices. For example, a data bus may transmit data between a host processing system and a peripheral device. However, this is merely an example and embodiments of the present invention are not limited in this respect.

A "communication node" as referred to herein relates to a structure or system for receiving data from a source, or transmitting data to a destination in a communication network. In one example, a communication node may forward data received in a data transmission (e.g., a data packet) from a source to a destination in a communication network according to destination information in the received data. A first communication node in a backbone communication infrastructure may receive data from or forward data to a second communication node. Alternatively, the first communication node may receive data from or forward data to edge devices or locations on an edge network. However, these are merely examples of a communication node and embodiments of the present invention are not limited in these respects.

A "communication channel" as referred to herein relates to a structure to transmit data between communication nodes in a communication network. An "ingress communication channel" as referred to herein relates to a communication channel to transmit data toward a communication node from a data source. An "egress communication channel" as referred to herein relates to a communication channel to transmit data away from a communication node toward a destination. However, these are merely examples of ingress and egress communication channels and embodiments of the present invention are not limited in these respects.

A "data communication channel" as referred to herein relates to a structure to transmit data in support of a service requirement between or among communication nodes in a communication network. Such a data communication channel may transmit data between communication nodes according to a data communication protocol. For example, a data communication channel may transmit data to or from an application associated with a first communication node to a second communication node. However, this is merely an example of a data communication channel and embodiments of the present invention are not limited in this respect.

A "control channel" as referred to herein relates to a structure to transmit "status data" to a communication node relating an ability of one or more communication nodes to transmit data in a data communication channel or to support a service requirement. Such status data may comprise commands and control information. For example, such status data may indicate an ability of one or more communication nodes to forward data from a source toward a destination.

Also, such status data may also indicate an ability of one or more communication nodes to support one or more service requirements. However these are merely examples of a control channel and status data, and embodiments of the present invention are not limited in this respect.

An "adjacent communication node" as referred to herein relates to a communication node coupled directly to a first communication node through a communication channel without any intermediate communication node. For example, a communication node may transmit a data message through a communication channel to an adjacent communication node without forwarding the data message through an intermediate communication node. However, this is merely an example of an adjacent communication node and embodiments of the present invention are not limited in this respect.

A "communication path dimension" as referred to herein relates to a definition of a relationship between or among communication nodes in a communication network. For example, communication channels may couple communication nodes in a communication network such that the positions of the communication nodes may be modeled/identified in a Cartesian coordinate system defining three or more dimensions. The relative position of two communication nodes may then be defined by a linear mapping along one or more communication channels in the coordinate system. Accordingly, a communication node may transmit data to an adjacent communication node through a communication channel in a communication path dimension. Additionally, data may be transmitted from a source communication node to a destination communication node by traversing multiple communication channels in different communication path dimensions. However, this is merely an example of a communication path dimension and embodiments of the present invention are not limited in these respect.

Briefly, an embodiment of the present invention relates to a system and method of transmitting data among communication nodes. A first communication node may be coupled to a plurality of adjacent communication nodes. The first communication node may receive a data transmission comprising a destination associated with a second communication node. The first communication node may receive status data from one or more adjacent communication nodes through a control channel coupled between the first communication node and the adjacent communication node where the status data comprises status information for at least the adjacent node. A communication node adjacent to the first communication node may be selected to forward the received data to a destination based upon the status data received from the adjacent communication nodes. However, this is merely an example embodiment and other embodiments are not limited in this respect.

Figure 1:
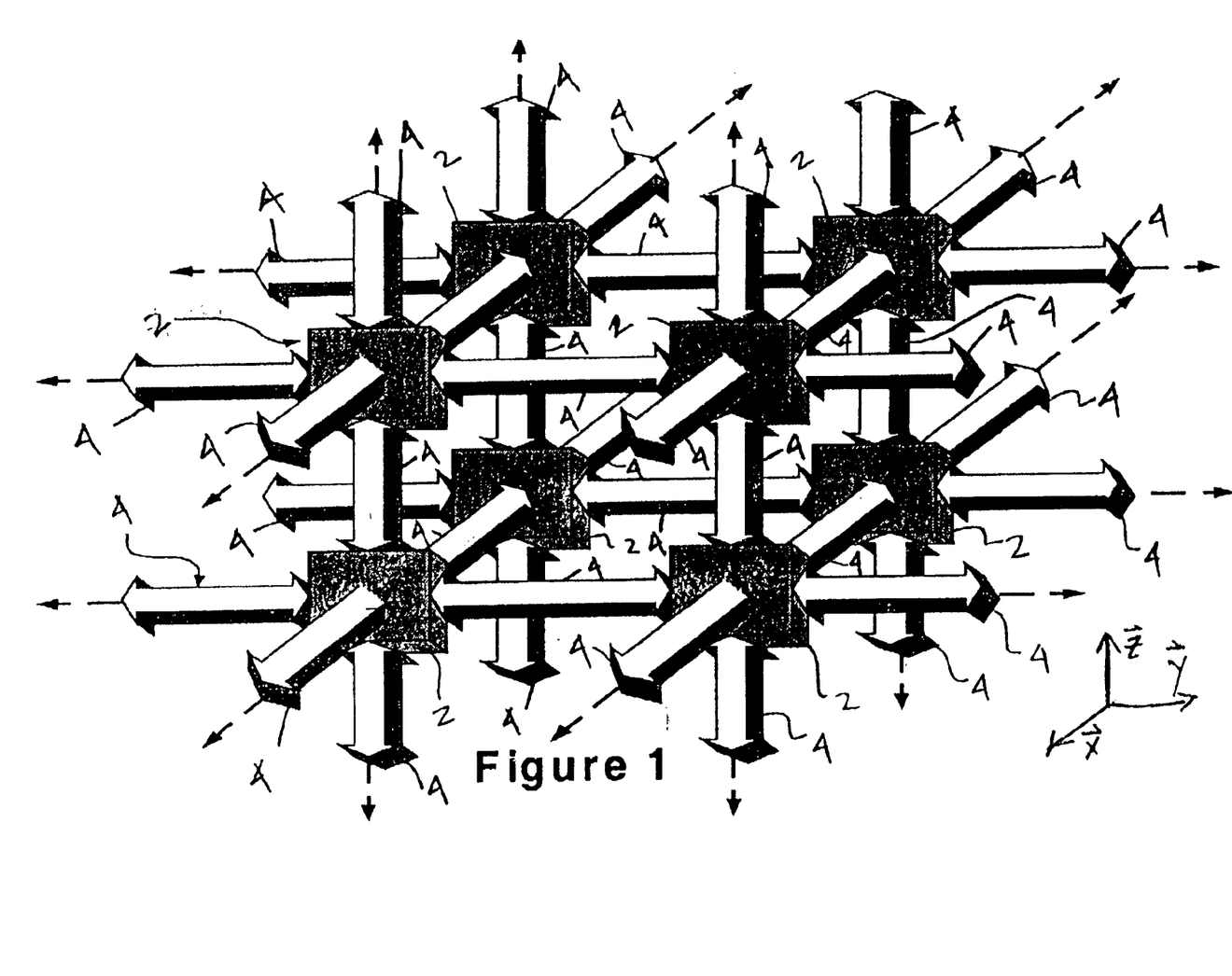
FIG. 1 shows a schematic of a communication system which comprises a plurality of communication nodes coupled together by communication channels.

FIG. 1 shows a schematic of a communication system which comprises a plurality of communication nodes 2 coupled together by communication channels 4. In addition to being coupled to one or more adjacent communication nodes 2, each communication node 2 may be coupled to one or more other edge communication networks such as, for example, metropolitan area networks (MANs), wide area networks (WANs), local area networks (LANs), server farms or Global Servers (not shown), or the like. According to an embodiment, data may be transmitted from any communication node 2 to a destination on an edge network through a communication node directly coupled to the edge network. Each communication node 2 may comprise a fabric router and/or capabilities for edge routing to other systems. However, these are merely examples of how inter-coupled communication nodes may be coupled to edge devices or networks and embodiments of the present invention are not limited in this respect.

Each communication node 2 may transmit data to any other communication node 2 through one or more communication channels 4 coupling adjacent communication nodes 2. Each communication channel 4 couples adjacent communication nodes 2 to enable the transmission of data between the adjacent communication nodes in a communication path dimension. In the illustrated embodiment, each communication channel 4 may transmit data between adjacent communication nodes 2 in six directions or two directions in either an x, y, or z communication path dimension as shown in FIG. 1. Modeling each communication node 2 as a cube having six faces, according to an embodiment, each face may provide input and output communication which yields six communication directions. Alternatively, such a cubic model of the communication nodes 2 may provide additional communication channels coupled adjacent communication nodes in additional communication path dimensions such as, for example, communication path dimensions in the xy, yz and xz planes (e.g., on the "edges" or "corners" of cubes representing the communication nodes 2). However, these are merely examples of how adjacent communication nodes may be coupled by communication channels for the transmission of data in communication path dimensions and embodiments of the present invention are not limited in these respects.

The aforementioned cubic model of a communication node may be generalized to a polyhedron model having more than six faces where each face of a communication node may be coupled to a face of an adjacent communication node to provide an input and output communication channels. Additionally, each "edge" or "corner" of such a polyhedron may be coupled to an edge or corner of an adjacent communication node. In an embodiment in which a network comprises polyhedron modeled communication nodes in a nationwide or worldwide network, each communication node may be allocated to a particular section of the geographic coverage. Data traffic from any particular section may then be routed through the nationwide or worldwide network through the allocated communication node. However, this is merely an example of how communication nodes may be deployed in a nationwide or worldwide network and embodiments of the present invention are not limited in this respect.

According to an embodiment, a communication node 2 may transmit data toward any destination communication node 2 through an adjacent communication node 2 by transmitting data on a communication channel 4 in a communication path dimension. The adjacent communication node 2 may then forward the data toward the destination communication node 2 on a subsequent communication channel 4 along the same or different communication path dimensions. The forwarding communication node 2 may select one of a plurality of communication channels 4 to forward the data to a subsequent adjacent communication node and so on until the data reaches the destination communication node 2. However, this is merely an example of how the data may be transmitted to a destination communication node through intermediate communication nodes and embodiments of the present invention are not limited in this respect.

According to embodiment, a communication node 2 may comprise logic to select a communication channel 4 to forward data to a destination communication node based upon the availability of intermediate communication nodes 2 to forward the data toward the destination in one or more communication path dimensions, or an ability to support a service requirement associated with the data. For example, a communication node 2 may receive status information indicating that an adjacent communication node 2 is inoperable or incapable of forwarding the data toward the destination communication node in one or more communication path dimensions, or is incapable of supporting one or more service requirements associated with the data. The forwarding communication node may then select from other adjacent communication nodes to forward the data. In other embodiments, in addition to having status information indicating the availability of an adjacent communication node to forward the data, a forwarding communication node 2 may also have status information indicating the availability of other, non-adjacent communication nodes to forward the data toward the destination communication node or to meet a service requirement associated with the data. Based upon this information, a forwarding communication node can select an adjacent communication node and communication channel 4 to forward the message toward the destination communication node 2. Such a selection may be based upon, for example a shortest expected time to forward the data to the destination communication node or a minimum number of expected forwarding intermediate communication nodes. However, these are merely examples of how a forwarding communication node may select an adjacent communication node to for forwarding data to a destination based upon status information, and embodiments of the present invention are not limited in this respect.

In the illustrated embodiment, the communication nodes 2 are arranged in a cubic arrangement along the three communication path dimensions x, y and z and each communication node may be associated with a corresponding Cartesian coordinate (x, y, z). Such a coordinate system may comprise an origin at (0, 0, 0) (e.g., corresponding with a "corner" communication node) where the coordinates may have a range of values (0 to $X_{max}$, 0 to $Y_{max}$, 0 to $Z_{max}$). In the illustrated embodiment, communication nodes 2 at opposite ends on a common a coordinate pair (e.g., a first communication node at (0, y, z) and a second communication node at ($X_{max}$, y, z) where y and z provide a common coordinate pair) may be directly coupled by a communication channel 4 such that the communication nodes 2 at opposite ends are adjacent to one another. Accordingly, such communication nodes at opposite ends may transmit data directly to one another independently of an intermediate communication node 2. However, this is merely an example of how communication nodes on opposite ends of a network may communication directly independently of an intermediate communication node and embodiments of the present invention are not limited in this respect.

Figure 2:
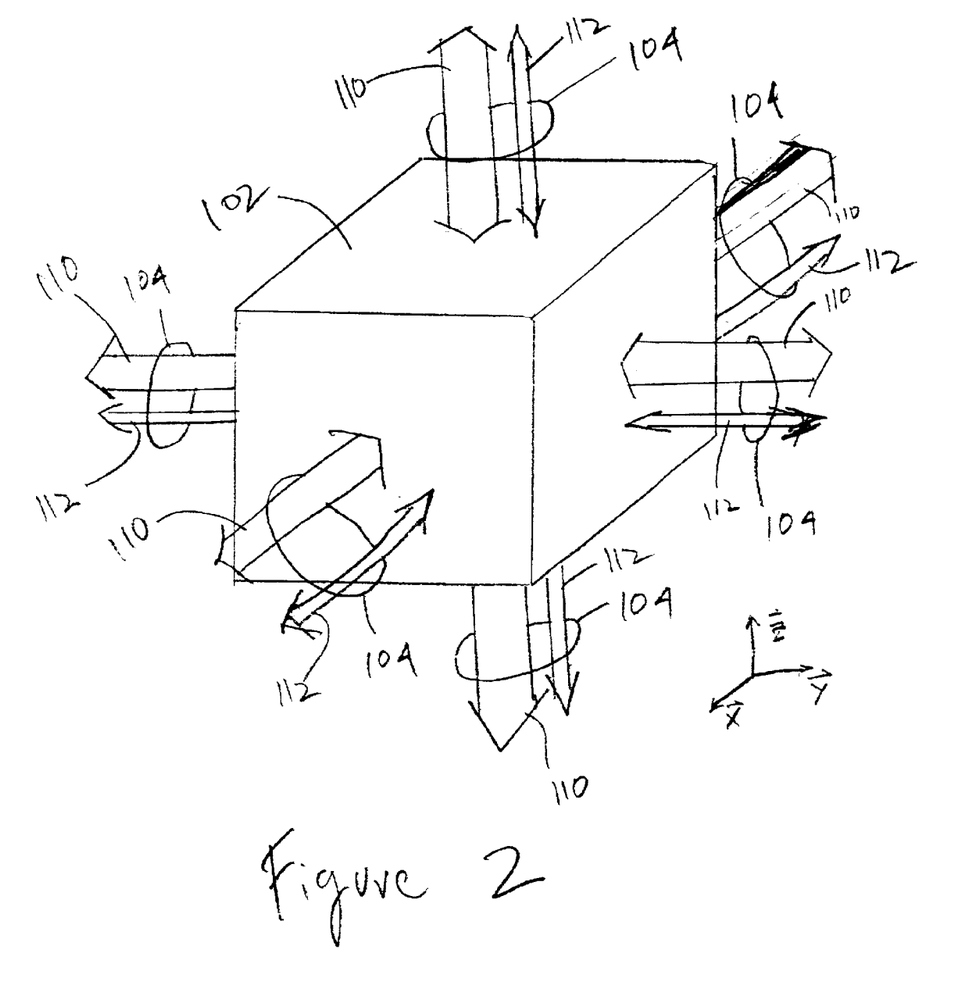
FIG. 2 shows a schematic of a communication node according to the embodiment shown in FIG. 1 in which communication channels comprise a data channel and a control channel.

FIG. 2 shows a schematic of a communication node 102 according to the embodiment shown in FIG. 1 in which each communication channel 104 comprises a data communication channel 110 and a control channel 112. Each of the communication channels 104 enable communication to an adjacent communication node in two directions along one of three communication path dimensions x, y or z. In the illustrated embodiment, each data communication channel 110 and control channel 112 comprise an ingress communication channel to receive data from an adjacent communication node and an egress communication channel to transmit data to an adjacent communication node. The data communication channels 110 may transmit data between adjacent communication nodes to be forwarded to a destination communication node. The control channels 112 may transmit status channels between communication nodes to indicate, for example, an availability of one or more communication nodes to forward data to a destination communication node. Based upon data received on one or more of the status channels 112, the communication node 102 may select a data communication channel 110 for forwarding data to a destination communication node through an adjacent communication node. However, this is merely an example of how a communication node may communicate with an adjacent communication node and embodiments of the present invention are not limited in this respect.

The communication channels 104 may comprise any one of several transmission mediums including, for example, copper or optical transmission medium. Each communication channel may comprise a single medium or multiple media to transmit data in either of two directions along an associated communication path dimension. In one embodiment, distinct transmission media may provide the data communication channel 110 and control channel 112. In another embodiment, a communication channel 104 may comprise a data communication channel 110 and control channel 112 in common transmission medium. For example, the data communication channel 110 and control channel 112 may be time multiplexed in the common transmission medium. Alternatively, the data communication channel 110 and control channel 112 may be multiplexed to concurrently occupy the transmission medium. However, these are merely examples of how a data channel and control channel may be implemented and embodiments of the present invention are not limited in these respects.

Also, respective ingress channel of a data communication channel 110 and control channel 112 of a communication channel 104 may be provided on a first transmission medium while respective egress channels of the data communication channel 110 and control channel 112 may be provided on a second transmission medium distinct from the first transmission medium. Alternatively, the ingress and egress channels of a data communication channel 110 or control channel 112 may be multiplexed in a common transmission medium. However, these are merely examples of how ingress and egress channels of either a data channel or control channel, and embodiments of the present invention are not limited in this respect.

Figure 3:
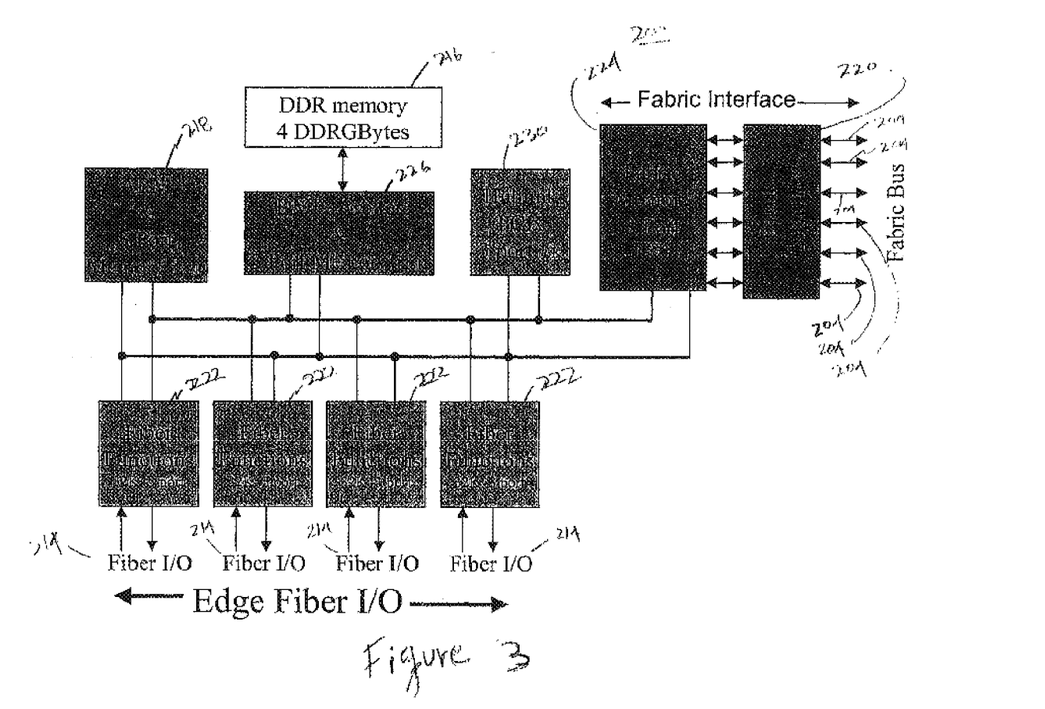
FIG. 3 shows a schematic of a system for managing communication traffic in a communication node according to an embodiment of the communication node shown in FIG. 2.

FIG. 3 shows a schematic of a system 200 for managing communication traffic in a communication node according to an embodiment of the communication node 102 shown in FIG. 2. In the illustrated embodiment, an optical transmission medium provides six communication channels 204 between the present communication node and six adjacent communication nodes (not shown). Each communication channel 204 may provide an ingress and egress communication channel for each of a data channel and a control channel in a communication path dimension. However, this is merely an example of how communication channels may be coupled to a communication node and embodiments of the present invention are not limited in this respect.

The system 200 also comprises edge input/output (I/O) channels 214 coupled to one or more edge networks or devices (not shown). Data may be transmitted between an edge I/O channel 214 and an adjacent communication node through a data communication channel in one of the communication channels 204. In the illustrated embodiment, the edge I/O channels 214 comprise an optical communication medium for transmitting data between the communication node and the edge networks or devices. However, this is merely an example of how edge networks or devices may communicate with a communication node and embodiments of the present invention are not limited in this respect.

Data may arrive from an edge device or edge network at an edge I/O channel 214 in the form of data packets which are to be forwarded to a destination associated with another communication node. Such data received at an edge I/O channel 214 may be encrypted and an associated fiber function 222 may comprise logic to decrypt the received data packets if a decryption key is available. Otherwise, the data packet may be forwarded to a fabric interface memory 224 for forwarding on an egress data channel of a communication channel 204. In the illustrated embodiment, data packets may be forwarded through the fabric interface 220 to a communication node based upon an IP address and/or an address identifying a destination communication node. The fiber functions 222 may comprise logic to associate a destination name in a data packet with a destination IP address to be appended to the data packet received from an edge device or edge network with information identifying a destination communication node. The data packet may then be forwarded to fabric memory 224 before being forwarded to a destination.

According to an embodiment, the fabric interface 220 may select an adjacent communication node and associated communication channel 204 to transmit data to a destination through a data communication channel. For example, the fabric interface 220 may comprise a fabric packet director to select a data communication channel to forward data received from one of the Edge I/O channels 214 to an adjacent communication node. Also, the fabric packet director may comprise logic to forward data received on an ingress data communication channel of a first communication channel 204 to an adjacent communication node on an egress data communication channel of a second communication channel 204. However, this is merely an example of how a communication node may select an adjacent communication node to forward data to a destination and embodiments of the present invention are not limited in this respect.

The fabric packet director may select a forwarding egress data communication channel of a data channel 204 based upon status information received from one or more ingress control channels of the communication channels 204. Such status information may include, for example, the availability of one or more communication nodes to forward data to a destination or an ability to meet a service requirement associated with the data packet. The fabric packet director then select a forwarding egress data channel based upon an expected number of "hops" or intermediate communication nodes to reach a destination communication node. Alternatively, such status information may also include information relating to expected delays in forwarding data from egress channels of particular communication nodes. The fabric packet director may then select a forwarding egress data communication channel based upon an expected delay to arrive at the destination communication node. However, these are merely examples of how a fabric packet director may select one of a plurality of egress data communication channels to forward a message and embodiments of the present invention are not limited in this respect.

The system 200 comprises a local processor 218 to perform local processing tasks such as, for example, handling exceptions, executing network processing functions (e.g., controlling routing of data packets among fiber functions 222 according to a network policy), and accessing local databases. The system 200 may also be coupled to an external processor (not shown) through a hublink 230 to a data bus (not shown). The external processor may provide commands to the local processor 218 through a control interface to implement one or more network policies. However, this is merely an example of how a system may employ a local processor and external processor to control how data is transmitted in a network, and embodiments of the present invention are not limited in this respect.

The system 200 further comprises a data movement engine (DME) 226 to store data packets in a memory 216 to be forwarded to a destination. The DME 226 may store one or more data packets which are to be combined and transmitted to a destination. Also, the DME 226 may delay forwarding one or more data packets to enable deeper packet analysis of related data packets. However, this is merely an example of how a data packet may be temporarily stored for future processing before being forwarded to a destination and embodiments of the present invention are not limited in this respect.

When a data packet arrives at a communication node to be forwarded to an edge destination such as an edge device (e.g., an edge device or destination on an edge network) coupled to an Edge I/O channel 214, an associated fiber function 222 may attempt to encrypt the data according to an encryption key corresponding to the edge destination. If the fiber function 222 cannot associate the received data with an edge destination address, the fiber function 222 may forward the data to DME engine 226 and transmit a message to the local processor 218 to request a determination of a destination address. The local processor 218 may then search DDR memory 216 for a destination address based upon other information in the data packet indicative of a destination. If such a destination address is located, the local processor 218 may then append the destination address to the received data in the DME engine 226 and initiate the transmission of the data packet to a destination associated with the appended address.

In the illustrated embodiment, a data packet may be forwarded to destinations according a destination address in the data packet. Accordingly, fiber functions 214, DME 226 or fabric interface 220 may access and maintain databases associating destination address with other information in a data packet which is indicative of a destination. Thus, if a data packet without a destination address is to be forwarded to a destination, a fiber function 214, DME 226, local processor 218 or fabric interface 220 may other information in the data packet with a destination address, append the destination address to the data packet, and initiate the transmission of the data packet toward the destination.

Upon associating a destination address to be appended to a data packet in the DME 226 as discussed above, the local processor 218 may transmit one or more messages to update data in the fiber function 222 (for forwarding data to the destination at the located destination address), or update data in the fabric memory 224 (for forwarding data received from adjacent communication nodes to edge networks or devices coupled to the Edge I/O channels 214). If the local processor 218 does not locate such a destination address in the DDR 216, the local processor 218 may query the external processor through a data bus (such as a PCI data bus) or hublink 230 to identify the destination address of the received data. Upon receiving such a destination address from the external processor, the local processor 218 may update the DDR 216 with the destination address then initiate the DME engine 226 to forward the data to the destination according to the destination address, and update data in the fiber function 222 or in the fabric memory 224 for forwarding data packets received in the future as discussed above. If the external processor cannot locate the destination address, the local processor 218 may transmit a message to the fabric interface 220 to broadcast a message on all communication channels 204 to identify a destination address associated with the received data. Communication nodes receiving the broadcast message may then query their respective edge devices or edge networks through I/O channels. If found, the destination address may be forwarded back to the local processor 218. The local processor 218 may then append the address to the data message for forwarding to a destination, and update data in the DDR memory 216, fiber function 222 and fabric memory 224 for future data packet processing as discussed above.

Figure 4:
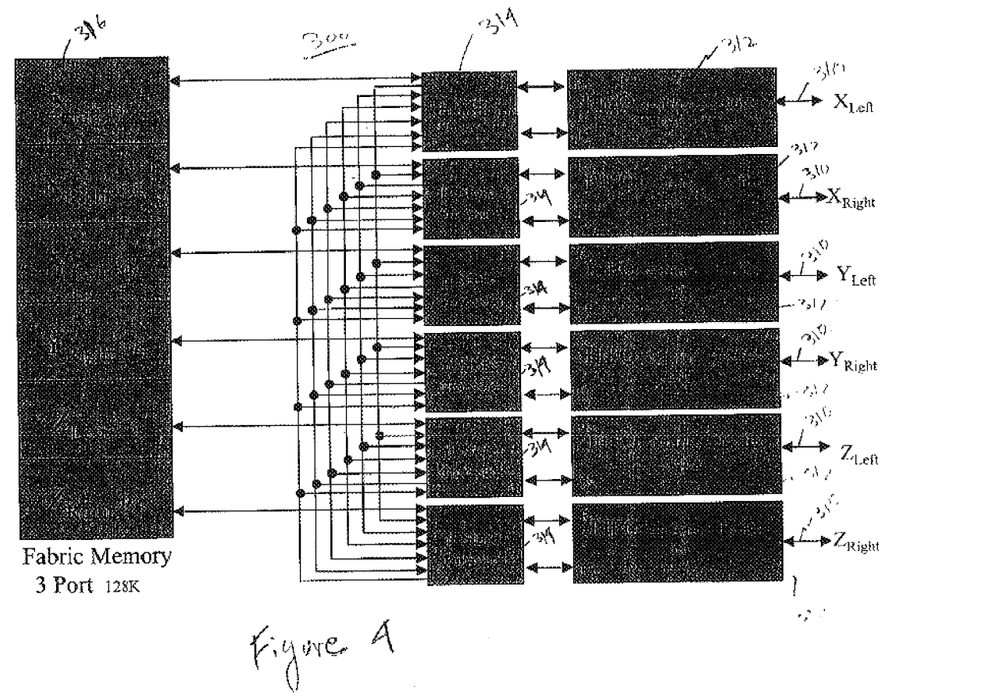
FIG. 4 shows a schematic of a packet director according to an embodiment of the system shown in FIG. 3.

FIG. 4 shows a schematic of a packet director 300 according to an embodiment of the system 200 shown in FIG. 3. Each of a plurality of data communication channels 310 is coupled to a buffer 312. Each buffer 312 may maintain one or more transmit queues for data packets to be forwarded to an adjacent communication node on an egress channel of a data communication channel 310 coupled to an adjacent communication node. Each buffer 312 may also maintain one or more receive queues for data messages to be forwarded to a transmit queue of another data communication channel 310 or to an edge device or network through an I/O channel.

The packet director 300 comprises a processor 314 for each data communication channel 310. In the illustrated embodiment, each processor 314 is associated with an ingress channel of a data channel 310 and comprises logic to forward data packets from the ingress channel to an egress channel of another data channel 310. For example, a processor 314 may examine a header of a data packet in a receive queue of a buffer 312 to determine how the received data packet is to be forwarded. Upon evaluating data in the header, the processor 314 may select an egress channel of a data communication channel 310 based upon rules or data packet forwarding criteria. The processor 314 may then forward portions of the header and payload of the received data packet to a forwarding processor 314 associated with the selected egress data channel and placed in a transmit queue of the associated buffer 312 for transmission to a adjacent communication node through the selected data communication channel 310.

According to an embodiment, a transmit queue of a first data communication channel 310 may be temporarily unable to accept a data packet received from an ingress channel of a second data communication channel 310. A processor 314 associated with the second data communication channel 310 may then store the received data packet in a portion of fabric memory 316 until the first data communication channel 310 is able to place the received data packet in the transmit queue. Meanwhile, the processor 314 associated with the second data communication channel 310 may continue forwarding data packets to other data channels 310. A processor 314 associated with the first data communication channel 310 may then notify the processor 314 associated with the second data communication channel 310 when the stored data packet may be retrieved from the fabric memory 316 and placed on the transmit queue of the first data channel.

According to an embodiment, the processors 314 may comprise logic to validate packets received on an ingress channel (of a data communication channel 310) from a cyclic redundancy code (CRC) included in the packet. If the CRC in the data packet is not validated, the packet director may transmit a message on an egress channel to the adjacent communication node that transmitted the packet to have the data packet resent. If a packet is validated, the packet director may transmit an acknowledgement on an egress channel to the adjacent communication node so that the adjacent communication node may delete the data packet from memory. However, this is merely an example of how a communication node may validate a CRC on a received data packet and embodiments of the present invention are not limited in this respect.

Figure 5:
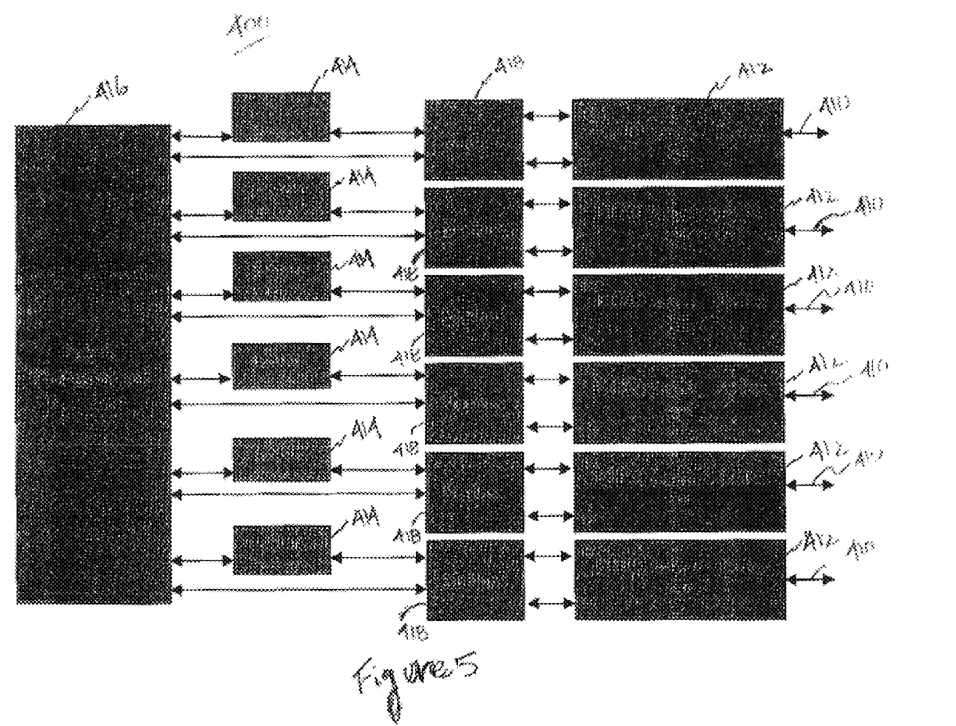
FIG. 5 shows a schematic of a message transfer signaling system according to an embodiment of the system shown in FIG. 3.

FIG. 5 shows a schematic of a message transfer signaling system 400 according to an embodiment of the system 200 shown in FIG. 3. Each of a plurality of control channels 410 may comprise an ingress channel for receiving status data from adjacent communication nodes and an egress channel for transmitting status data to adjacent communication nodes. In the illustrated embodiment, processors 414 may collect process status data received from adjacent communication nodes on ingress channels of the control channels 310. Additionally, the processors 414 may perform the function of the processors 314 in the fabric packet director 300 described above with reference to FIG. 4. Based upon the status data received from the control channels 410, the processors 414 may select an egress data channel (e.g., an egress channel of a data channel 310 shown in FIG. 4) to forward a received data packet to an adjacent communication node toward a destination.

A fabric processor 416 may define rules for forwarding data packets to egress data communication channels based upon a network policy to be implemented by the processors 414 when processing headers of data packets received on an ingress data communication channel. For example, the fabric processor 416 may define rules to support services (e.g., VoIP, virtual private networks, e-commerce services). Such a network policy may be established by other external processes such as, for example, an external processor (e.g., the external processor coupled to the hublink 230 as described with reference to FIG. 3). The rules may then be transmitted to the processors 414 in an extensible format to be used in forwarding data packets to adjacent communication nodes on egress data communication channels.

According to an embodiment, the processors 414 may forward data packets as discussed above with reference to FIG. 4 (e.g., forwarding to an adjacent communication node through an egress channel of a data communication channel 310) based upon status received from adjacent communication nodes and subject to the extensible rules provided by the fabric processor 416. For example, an extensible rule may dictate that data packets are forwarded to a destination communication node so as to minimize an expected delay. This may entail a selection of a forwarding adjacent communication node which minimizes the expected number of "hops" to the destination communication node from the forwarding communication node. However, this is merely an example of an extensible rule to define how data packets may be forwarded to an adjacent communication node based upon status data and embodiments of the present invention are not limited in this respect.

According to an embodiment, the processors 314 and 416 may define an extensible language to support service classes and quality of service associated with data packets. Data packets may comprise one or more words relating to routing, services and commands. The processors 314 and 416 may interpret the words to implement a network policy for providing video, voice or other types of services. Such an extensible language may be implemented universally among communication nodes in a network as shown in FIG. 1.

In an embodiment in which the communication nodes to be coupled by communication channels in three communication path dimensions x, y and z as illustrated above with reference to FIGS. 1 and 2, for example, the minimum possible number of hops may be determined by using three dimensional matrix arithmetic. A routing distance may be determined by adding the differences in the x, y and z communication path dimensions separating the forwarding communication node and the destination communication node (e.g., the number of intermediate communication nodes or hops in each of the communication path dimensions). In an embodiment in which communication nodes at opposite ends on a common coordinate pair are directly coupled by a communication channel independently of an intermediate communication node, however, one or more additional routing distances may be determined from a route in a direction away from the forwarding communication node and away from destination communication node (e.g., toward a node at the "end" of the network) where the route may include a communication channel coupling communication nodes at opposite ends of the network. A route selected at the forwarding communication node may then may then comprise the fewest number of expected hops. However, this is merely an example of how a forwarding communication node may select a route for forwarding data to a destination communication node and embodiments of the present invention are not limited in this respect.

Also, a data packet may be transmitted from the forwarding communication node in any of several paths to the destination communication node. However, one or more intermediate communication node may be inoperative or unavailable to forward the data packet in a particular one of these paths. If information indicating the inability of a communication node to forward the data packet in a particular data path is reflected in status data received at the forwarding communication node, the processor 414 of the forwarding communication node may select an adjacent communication node capable of forwarding the data packet in an alternative path.

According to an embodiment, the processors 414 receive status data from adjacent communication nodes on respective ingress channels of the control channels 410. The status data from any one adjacent communication node may comprise status data regarding the ability or availability of each egress data channel to forward data packets to a destination. Additionally, the adjacent communication node may forward status data received from other communication nodes adjacent to the adjacent communication nodes (e.g., two communication nodes removed from the present communication node). The status data may also include status data indicating the ability or availability of egress data channels of three (or more) communications nodes removed from the present communication node. The status data received on an ingress channel of a control channel 410 may then be shared among the processors 414. The fabric processor 416 may establish how processors 414 may share information such as routing preferences and obstructions (e.g., intermediate nodes that are unavailable to forward data or unable to meet a service requirement). This information may be may be derived from messages on control channels from adjacent communication nodes and their adjacent communication nodes (e.g., two communications node away from the present communication node) through the control channels 410. The control channels 410 may also transmit debugging information and status information for tracking data packets through the network.

According to an embodiment, the control channels 410 comprise egress data channels to forward status data to adjacent communication nodes. The status data may comprise data regarding the ability or availability of each egress data channel in the present communication node to forward data packets to a destination. Additionally, mailboxes 418 may comprise logic and memory to organize status data received from adjacent communication nodes on ingress channels of the control channels 410. The status data in the mailboxes 418 may then be forwarded to adjacent communication nodes to enable the selection of egress data channels for forwarding data based upon status data regarding the availability or ability of egress data channels of non-adjacent communication nodes to forward data packets to a destination.

In the embodiments illustrated with reference to FIGS. 4 and 5, a communication node comprises six ingress and egress channels between each of six corresponding adjacent communication nodes. Therefore, such a communication node may be modeled as having a "cubic" structure as discussed above with reference to FIG. 1. It should be understood that the embodiments of FIGS. 4 and 5 may be scaled to communication nodes modeled as a higher order polyhedron (e.g., having more than six faces) such that the message transfer signaling system 400 comprises more than six control channels 410 and processors 414, and the packet director 300 comprises more than six data communication channels 310, processors 314 and buffers 312. However, these are merely examples of how a communication node may be scaled to be modeled as such a higher order polyhedron and embodiments of the present invention are not limited in this respect.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:

receiving a data transmission from a forwarding adjacent communication node among a plurality of adjacent communication nodes, the data transmission comprising a destination associated with a destination communication node;

receiving status data from each adjacent communication node through a control channel coupled to the adjacent communication node, the status data comprising status information for at least the adjacent communication node;

processing the status data received from each adjacent communication node at one of a plurality of link processors, each link processor being associated with one of the adjacent communication nodes including the forwarding adjacent communication node; and at the link processor associated with the forwarding adjacent communication node, selecting an adjacent communication node from among the plurality of adjacent communication nodes to forward the received data transmission based, at least in part, upon processed status data received from the other link processors and an expected number of communication nodes between the selected adjacent node and the determining the communication node associated with the destination.

2. The method of claim 1, wherein each of the communication nodes adjacent to the first communication node is associated with one of a plurality of communication path dimensions.

3. The method of claim 1, wherein the status information comprises availability information indicative of an availability of one or more communication nodes to forward the data transmission, and wherein the method further comprises determining the expected number of communication nodes based upon the availability information.

4. The method of claim 1, wherein the status information from each adjacent communication node comprises status information for at least the adjacent communication node and one communication node adjacent to the adjacent communication node.

5. The method of claim 1, wherein the method further comprises:
receiving the status information from each adjacent communication nodes at a first field of bits of a data bus coupled between the first communication node and the adjacent communication node; and
forwarding the data transmission to the selected adjacent communication node on a second field of bits of a data bus coupled to the selected adjacent communication node.

6. The method of claim 5, wherein the method further comprises:
receiving a broadcast message from a first adjacent communication node on a data bus coupled to the adjacent communication node; and
forwarding the broadcast message to adjacent communication nodes other than the first adjacent communication node.

7. The method of claim 6, wherein the method further comprises:
maintaining a record of broadcast messages forwarded to adjacent communication nodes; and
suspending forwarding received broadcast messages previously forwarded to adjacent communication nodes.

8. The method of claim 1, wherein the method further comprises enqueuing the received data transmission for forwarding through an adjacent communication based upon a quality of service associated with the data transmission.

9. A communication node comprising:
a plurality of ports, each port being capable of coupling to an adjacent communication node to receive a data transmission from the adjacent communication node, the data transmission comprising a destination associated with a forwarding adjacent communication node; and
a plurality of link processors, each link processor being associated with one of the adjacent communication nodes including the forwarding adjacent communication node to process status data from the associated adjacent communication node, the status data comprising status information for at least the associated adjacent communication node, each link processor comprising logic to select the forwarding adjacent communication node from among the plurality of adjacent communication nodes to forward the received data transmission based, at least in part, upon processed status data received from the other link processors and an expected number of communication nodes between the selected adjacent node and a communication node associated with the destination.

10. The communication node of claim 9, wherein the communication node is adapted to be coupled to each of a plurality of adjacent communication nodes by a communication channel, each communication channel being capable of transmitting data in one of a plurality of communication path dimensions.

11. The communication node of claim 9, wherein the status information comprises availability information indicative of an availability of one or more communication nodes to forward the data transmission, and wherein each link processor further comprises logic to determine the expected number of communication nodes based upon the availability information.

12. The communication node of claim 9, wherein the status information from each adjacent communication node comprises status information of at least the adjacent communication node and one communication node adjacent to the adjacent communication node.

13. The communication node of claim 9, the communication node further comprising:
logic to receive the status information from each adjacent communication node at a first field of bits of a data bus coupled to the adjacent communication node; and
logic to forward the data transmission to the selected communication mode on a second field of bits of a data bus coupled between the first communication node and the selected communication node.

14. The communication node of claim 13, the communication node further comprising;
logic to receive a broadcast message from a first adjacent communication node on a data bus coupled to the adjacent communication node; and
logic to forward the broadcast message to adjacent communication nodes other than the first adjacent communication node.

15. The communication node of claim 14, wherein each link processor further comprises:
logic to maintain a record of broadcast messages forwarded to adjacent communication nodes; and
logic to suspend forwarding received broadcast messages previously forwarded to adjacent communication nodes.

16. The communication node of claim 9, the communication node further comprising logic to enqueue the received data transmission for forwarding through an adjacent communication based upon a quality of service associated with the data transmission.

17. A system to transmit data to a destination comprising a plurality of communication nodes, at least one of the communication nodes being coupled to the destination, and at least one of the communication nodes being a forwarding communication node to forward a data transmission to the destination, the forwarding communication node comprising:
a plurality of ports, each port being coupled to one of a plurality of adjacent communication nodes to receive a data transmission from the adjacent communication nodes; and
a plurality of link processors, each link processor being associated with one of the adjacent communication nodes to process status data from the associated adjacent communication node, the status data comprising status information for at least the associated adjacent communication node, each link processor comprising logic to select an adjacent communication node from among the plurality of adjacent communication nodes to receive the received data transmission based, at least in part, upon processed status data received from the other link processors and an expected number of communication nodes between the selected adjacent node and the communication node coupled to the destination.

18. The system of claim 17, wherein the status information comprises availability information indicative of an availability of one or more communication nodes to forward the data transmission, and wherein the system further comprises logic to determine the expected number of communication nodes based upon the availability information.

19. The system of claim 17, wherein the status information from each adjacent communication node comprises status information of the adjacent communication node and at least one communication node adjacent to the adjacent communication node.

20. The system of claim 17, wherein each link processor comprises logic to enqueue the received data transmission for forwarding through an adjacent communication based upon a quality of service associated with the data transmission.

* * * * *